May 7, 1929.  C. J. ALEXANDER  1,711,766
FLOATING FISH TRAP
Filed Jan. 25, 1926   2 Sheets-Sheet 2
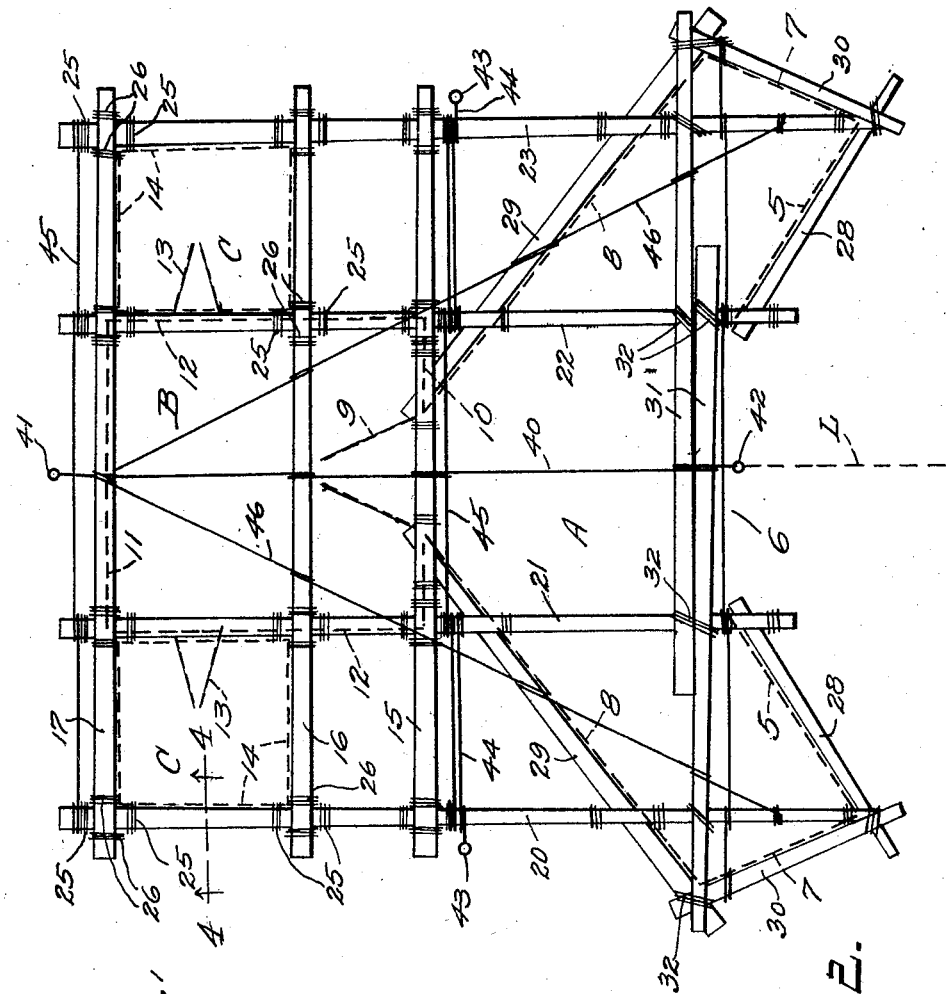
INVENTOR:
Clarence J. Alexander
BY
Pierre James
ATTORNEY Patented May 7, 1929.

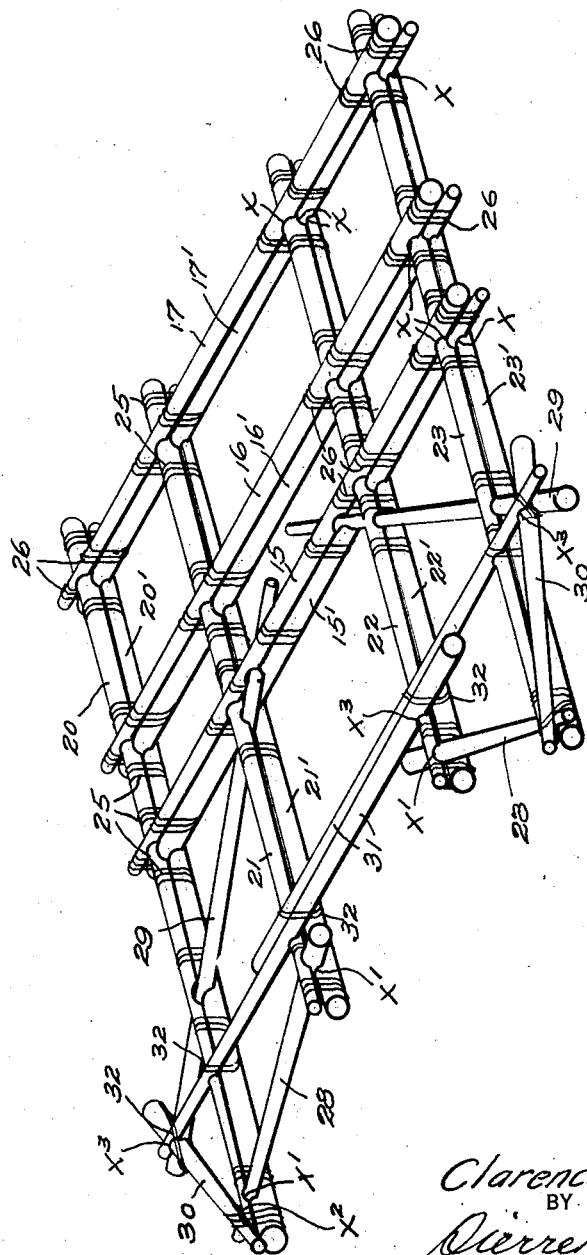

1,711,766

UNITED STATES PATENT OFFICE.

CLARENCE J. ALEXANDER, OF KETCHIKAN, TERRITORY OF ALASKA.

FLOATING FISH TRAP.

Application filed January 25, 1926. Serial No. 83,527.

This invention relates to a floating fish-trap and, more especially, to the construction of a buoyant frame which supports the trap netting.

The object of the invention is the provision of a fish-trap frame of this character which will be inexpensive to make, durable in use, and of sufficient strength and rigidity to withstand the action of waves in rough waters.

More specific objects and advantages of the invention will appear in the following description.

The fish-trap frame, constituting the subject matter of the present invention, consists of an assemblage of trusses and bracing members arranged in transverse, longitudinal and diagonal directions with respect to the trap, engaged with one another at the respective intersections and having the trusses and braces secured in such interengaged relations by banding the same with straps or cables.

The invention further consists of a frame structure of the type above referred to, wherein the parts are joined together, stayed and braced in a manner to prevent the frame becoming distorted, strained or broken to accommodate wave movements.

The invention still further consists in the novel construction, adaptation and combination of parts hereinafter described and claimed.

In the accompanying drawings,—

Figure 1 is a perspective view of a fish-trap frame constructed in accordance with the present invention. Fig. 2 is a plan view of a fish trap embodying the frame shown in Fig. 1, said frame being equipped with stay cables, not shown in Fig. 1, the trap netting, which is supported by the frame, is represented by broken lines. Fig. 3 is a perspective view of portions of associated parts of the frame structure. Fig. 4 is a detail sectional view taken substantially on line 4—4 of Fig. 2.

Referring first to Fig. 2, I illustrate somewhat diagrammatically by broken lines the general arrangement of netting walls such as employed in salmon traps, wherein,—5 represents the end walls disposed at each side of the trap entrance 6 and connected with side walls 7 and 8 which latter converge to a tunnel 9. The walls 5, 7 and 8 constitute the walls of the heart member A of the trap. The tunnel 9 extends into the pot B, so called, which is bounded by end walls 10 and 11, and side walls 12.

At one or both sides of said pot is a spiller C, two being shown, into which the fish enter through tunnels 13 from the pot B. Each of the members A, B and C is provided with a floor (not shown) of netting. The netting 14 of spillers C are arranged to be hoisted for dumping the fish entrapped therein into a scow or boat. L represents a netting designated as a lead which is employed to direct fish into the trap. The trap netting and the arrangement thereof as above described is not new and forms per se no part of the present invention.

According to my invention, I provide a skeleton raft or frame composed of timbers or logs as hereinafter termed. In the trap construction I use longitudinally arranged logs disposed in pairs, as 20—$20^1$, 21—$21^1$, 22—$22^1$, and 23—$23^1$ (Fig. 1), the complementary logs of the respective pairs being disposed one above the other, and parallel, or nearly so, with the longitudinal axis of the frame. Said longitudinal logs are preferably located to be above the longitudinal walls approximately of the trap pot B and spillers C. Associated with said longitudinal logs are transverse logs which are also disposed in pairs, three pairs being shown, 15—$15^1$, 16—$16^1$, and 17—$17^1$, the complementary logs of the respective pairs being arranged one above the other and substantially parallel with each other and with the logs of the other such pairs of transverse logs.

Said transverse pairs of logs are furthermore disposed to have the logs 15—$15^1$ and 17—$17^1$ located approximately in the planes of the vertical walls 10 and 11 of the netting of the pot; the logs 16—$16^1$ and 17—$17^1$ being located to support the front and rear walls of the netting of the spillers.

Said longitudinal and transverse logs where they cross each other are disposed in alternate relations one above the other as, for example a longitudinal log underneath, a transverse log next above, then a longitudinal log and finally a transverse log on top. Each of the three upper logs at a crossing is notched in its under side as at X to provide a recess to receive a portion of the log next below, thereby providing interfitting connections at the various crossings. To secure the logs in such interfitting connections the companion logs of each pair of longitudinal and transverse logs are coupled at each side of a joint by lashings such as 25 and 26 for the longitudinal and transverse logs, respectively.

The preferred manner of lashing the companion logs is best shown in Figs. 1 and 4 employing wire cables which are wound about the respective pairs of logs and securing the cable ends to the logs as by means of staples 27, (Fig. 4) driven into the respective logs.

The pairs of logs 15—15$^1$, 16—16$^1$ and 17—17$^1$, when united by the cables 26 to clamp therebetween the logs 20, 21, 22 and 23, constitute a system of transversely arranged trusses to prevent lateral warping of the trap frame. In like manner, longitudinal warping of the frame is obviated by the provision of a system of longitudinal trusses composed of the pairs of logs 20—20$^1$, 21—21$^1$, 22—22$^1$ and 23—23$^1$ which are secured in clamped relation with the logs 15$^1$, 16$^1$ and 17$^1$.

The portions of the longitudinal trusses which protrude in front of the transverse logs 15—15$^1$ carry diagonally disposed logs 28 and 29 disposed approximately above the netting walls 5 and 8 of the heart at each side of the trap. These logs 28 and 29 extend between the companion logs of each pair of longitudinal logs at the crossing and have notched connections one with the other as indicated by X$^1$ in Fig. 1. The longitudinal logs 20 also support ends of diagonal logs 30 one at each side of the trap, the other ends of the logs 30 being supported by the associated logs 29.

The logs 30 are disposed to be over, approximately, the heart walls. Logs 30 are provided with notches X$^2$ to receive the log next below at each crossing.

Supported upon the longitudinal logs 20, 21, 22 and 23 near the front end of the trap is a transverse log or logs 31 of a length to extend over the joints of the logs 29 and 30. The logs 31 constitute transverse braces and are notched as at X$^3$ at the crossings thereof with the other logs. These logs 31 are secured to the other logs which they cross by means of lashings such as indicated by 32. The above described frame is composed of logs which are secured together by means of interfitting connections and lashings and without the use of bolts or spikes, providing a structure having strength and rigidity to withstand the disrupting action of the waves of water where used. The use of the pairs of associated longitudinal and transverse logs coupled together by lashings constitute trusses which in themselves are rigid, and when combined in the frame produces a rigid structure of great strength.

A trap embodying my invention may be secured at a selected fishing place in any known or suitable manner as, for example, by means of a stay cable 40 secured to the frame, the ends of said cable being provided with eyes 41 and 42 for attachment, respectively, to a head anchor line and a lead anchor line. At each side of the frame is provided means such as an eye 43, which may be secured to stays or tie-cables 44 of the frame to receive what are known as breast anchor lines. These cables furthermore serve to couple pairs of longitudinal trusses together.

The anchor lines, above referred to, are so well known in the art that it is deemed unnecessary to illustrate the same in the drawings. To prevent the frame from becoming strained or distorted by stresses due to rough seas, gales of wind or otherwise, the frame is reinforced by said stay-cables 44 and other cable stays such, for instance, as transverse stays 45, and diagonal stays 46.

The frame, it is to be understood, may be constructed of sawed timber or logs, and where the latter are utilized, the same are reversely arranged, desirably, in each pair thereof as shown in Fig. 1.

What I claim, is:—

1. A buoyant frame for a floating fish trap, said frame being of a substantially rectangular shape composed of pairs of longitudinal vertically-spaced apart timbers, pairs of transverse vertically-spaced apart timbers, and diagonally disposed timbers supported by said transverse timbers, said timbers being arranged to cross each other, and banding means for securing the complementary timbers of each pair thereof in clamping relation with respect to timbers of the other pairs at the intersections thereof.

2. A fish trap frame having longitudinally and transversely arranged truss members disposed in crossed relation with each other, each of said truss members being formed of companion timbers disposed one above the other and lashings for securing the companion timbers of each of the truss members together and in clamping relation with the respective crossing trusses.

Signed at Ketchikan, Alaska, this 31st day of October, 1925.

CLARENCE J. ALEXANDER.